United States Patent [19]

Farrell

[11] 3,834,848

[45] Sept. 10, 1974

[54] MOLDING APPARATUS WITH CORE ROD OBSTRUCTION SENSORS

[75] Inventor: John J. Farrell, Green Brook, N.J.

[73] Assignee: Farrell Patent Company, Dunellen, N.J.

[22] Filed: Apr. 24, 1973

[21] Appl. No.: 353,962

[52] U.S. Cl......... 425/136, 425/154, 425/DIG. 231, 425/DIG. 209
[51] Int. Cl.......................... B29c 17/07, B29d 1/00
[58] Field of Search........... 425/137, 136, DIG. 231, 425/DIG. 209, 242 B, 154

[56] References Cited
UNITED STATES PATENTS
2,853,736  9/1958  Gussoni ..................... 425/DIG. 209
3,100,913  8/1963  De Matteo .......................... 425/137

Primary Examiner—J. Spencer Overholser
Assistant Examiner—David S. Safran
Attorney, Agent, or Firm—Sandoe, Hopgood & Calimafde

[57] ABSTRACT

Molding machines commonly have polygonal indexing heads with straight side faces from which core rods extend. Molded articles are stripped from the core rods at a stripping station; and sensing means beyond the stripping station detect any residual molding material that may not have been stripped. Upon detecting such material, the sensing means cause the machine to stop before a mold at the next station closes on the residue on the core rod. This invention moves the sensing devices toward and from the axis of rotation of the indexing head to compensate for the fact that the head is not round and to thereby operate over a greater length of the core rod.

13 Claims, 13 Drawing Figures

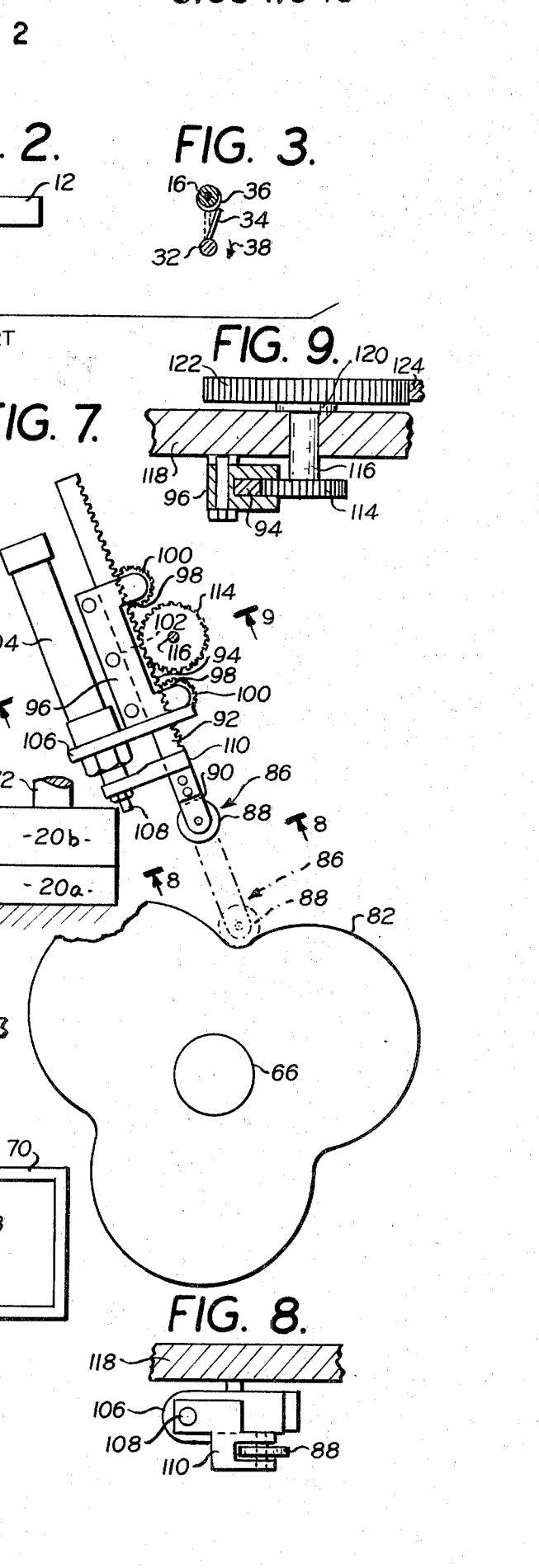

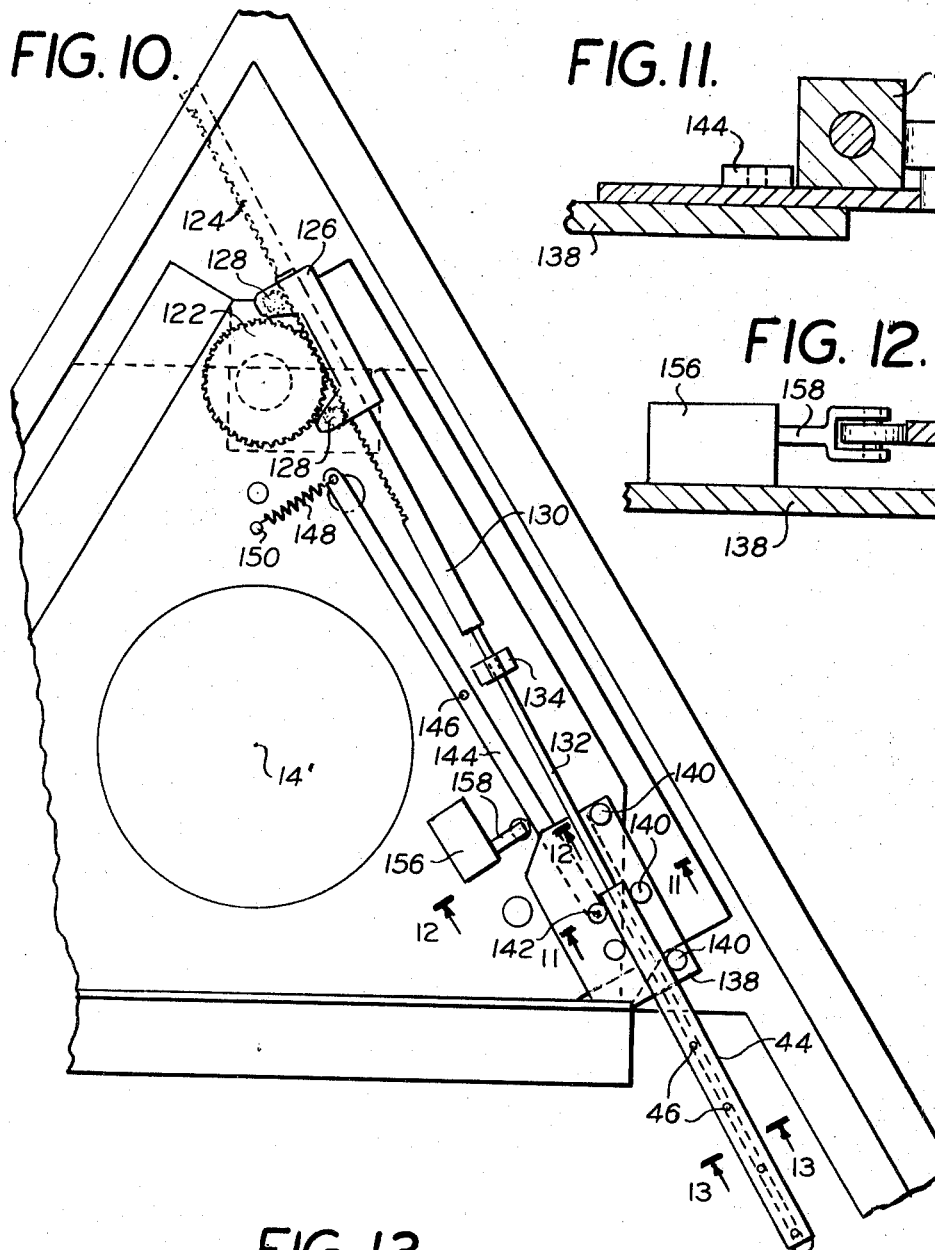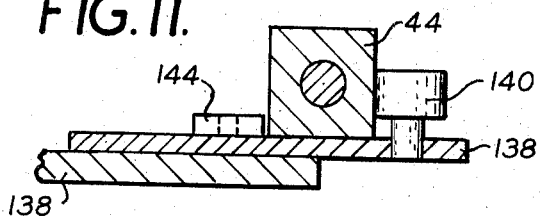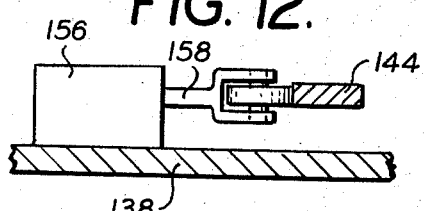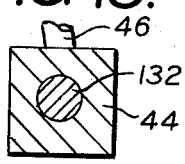

MOLDING APPARATUS WITH CORE ROD OBSTRUCTION SENSORS

BACKGROUND AND SUMMARY OF THE INVENTION

Molding machines having multiple cavity molds are commonly provided with indexing heads having straight side faces from which core rods extend into the cavities of the mold at each molding station. The indexing head moves angularly and intermittently to shift the core rods from one operational station to the next and finally to a stripping station at which molded articles are stripped from the core rods. Sometimes a piece of molding material is left on a core rod because of some imperfection in the operation of the machine. Unless this residue is removed, before the next molding operation, the molded article on that core rod will be defective and the mold may be damaged if the residue is at a part of the core rod against which the mold contacts when it closes.

Sensors are located along the path of travel of the core rods as they pass from the stripping station to the next molding station and these sensing means have devices for detecting the presence of any residual molding material on a core rod as the core rod passes the sensing device.

Because of the fact that the sensing devices are located at a fixed distance from the axis of rotation of the indexing head, they do not sense the same portion of the length of successive core rods. When a straight side face of a polygonal indexing head passes the sensing devices, the mid portion of the straight face is closer to the axis of rotation of the head than are the opposite ends of the flat face. Thus a core rod extending from a mid portion of the face has its juncture with the indexing head further from the sensing devices than is the case with the core rods which are nearer to the ends of the flat face.

This invention compensates for the fact that the indexing head is polygonal instead of being cylindrical. The compensation is effected by having the sensing means move toward and from the axis of rotation of the indexing head in timed relation with the angular movement of the indexing head and in such a way that the sensing means sense the same portion of the length of each core rod and thereby insure that the portions of the core rods which must be clean for satisfactory operation are in fact clean.

Because of the fact that the sensing devices of this invention always scan the same portion of each core rod length, it is practical to use sensing means with this invention that are shaped to the contour of a core rod, when the indexing head is equipped with core rods that are of different diameter along different portions of their operational length.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic view showing the type of molding machine with which the present invention is used;

FIG. 2 is an enlarged elevational view taken on the line 2—2 of FIG. 1;

FIG. 3 is an enlarged sectional view taken on the line 3—3 of FIG. 2;

FIGS. 4 and 5 are diagrammatic views showing the sensing apparatus of this invention and the mode of operation;

FIG. 6 is a diagrammatic sectional view through a molding machine to which the present invention is applied;

FIG. 7 is a diagrammatic fragmentary view of a portion of the apparatus shown in FIG. 6;

FIG. 8 is an end view of the cam follower and associated mechanism shown in FIG. 7 with the cam follower pushed back away from the cam;

FIG. 9 is an enlarged sectional view taken on the line 9—9 of FIG. 7;

FIG. 10 is a greatly enlarged view looking down on the top of the molding machine just below the indexing head and showing the sensing means and the sensing devices that are moved closer to and further from the center of rotation of the indexing head as the indexing head is moved angularly about its axis of rotation; and FIGS. 11, 12 and 13 are greatly enlarged sectional views taken on the lines 11—11, 12—12 and 13—13, respectively, of FIG. 10.

DESCRIPTION OF PREFERRED EMBODIMENT

FIG. 1 shows a diagrammatic representation of a blow molding machine. This machine has a polygonal indexing head 12 which is shown in the drawing as being triangular. The indexing head rotates about a center axis 14 to intermittently move core rods 16 from one operational station to the next. In the case of the triangular head, each successive movement of the indexing head is through an angle of 120°. The operational stations include an injection station 18 at which there is an injection mold 20 with cavities for receiving the five core rods 16. These core rods project from a flat face of the indexing head 12 which confronts the injection mold 20 when the indexing head is in the position shown in FIG. 1.

Plastic is injected into the multiple cavities of the injection mold 20 to form parisons on the core rods 16. The mold 20 then opens and the indexing head rises sufficiently to permit the core rods 16 and the parisons thereon to clear the sections of the mold 20 as the indexing head 12 moves counterclockwise through an angle of 120°. This movement brings the core rods 16 from the injection mold 20 to a blowing mold 24 which is open to permit the core rods to move into positions in alignment with the multiple cavities of the blow mold 20. The blow mold then closes on the core rods and the parisons are blown while core rods from the next face of the indexing head receive parisons in the injection mold 20.

After the particles have been blown in the blowing mold 24, the indexing head carries the core rods 16 to a stripper station 26 at which a stripper comb 28 rises to a position embracing the core rods at the stripping station 26; and the stripper comb 28 then moves away from the indexing head 12 so as to eject the molded articles from the core rods 16.

The next angular movement of the indexing head 12 carries the core rods at the stripping station 26 back to the injection station 18; and it is important that the core rods be clean and free of any residual molding material before they are again inserted in the injection mold 20. Sensing means 30 are located between the stripping station 26 and the injection station 18.

FIG. 2 shows the sensing means 30 consisting of a support 32 having a plurality of individual fingers 34 extending upwardly close to the location of successive core rods 16 as they pass across the sensing means 30. These fingers or sensing devices 34 do not quite touch the core rods 16 if the core rods are clean; but if there is any residue on one of the core rods, that residue will strike against one or more of the fingers 34 and cause the fingers to be displaced.

FIG. 3 shows a core rod 16, on an enlarged scale as compared to FIG. 2, and with residual molding material 36 clinging to the core rod 16 in a position to displace one of the fingers 34 so that the support 32 is rocked in a clockwise direction as indicated by the arrow 38 in FIG. 3. This movement of the support 32 can operate an electric switch or in any other suitable way to cause the machine to stop so that the core rod will not be introduced into the injection mold with residual material adhering to the core rod. Depending upon what part of the length of the core rod the residual material 36 is located, this material would cause the next article made on that core rod to be defective, or would be at a location wherein the injection mold closed on the residual material where the mold was intended to contact the core rod. This latter situation is injurious to the mold and prevents the mold from fully closing so that there is danger of the hot injected plastic escaping from the mold into contact with the indexing head and other parts of the machine.

Referring again to FIG. 1, it will be noted that the sensing means 30 are located as close to the indexing head 12 as they can be and still have the indexing head clear the sensing means as it rotates intermittently to move core rods from one operational station to the next. It will also be apparent that a center point on each face of the indexing head will travel around the circular path indicated by the dotted circle 40 in FIG. 1. This circle 40 is quite far from the sensing means 30 and thus the end of a core rod 16, which projects from a mid portion of any one of the straight side faces of the injection head 20, has a good portion of its length too far in toward the axis 14 to be scanned by the sensing means 30.

While the vertexes of the triangular head 12 can be rounded off or cut off to form short straight sides, this will permit the centering means 20 to be somewhat closer to the center of rotation 14 but the problem is only partly solved. The straight sides of a polygonal indexing head 12, with multiple core rods extending from these side faces, have the core rods at the mid portions of the flat faces closer to the axis of rotation 14 than are the core rods which are nearer to the ends of the flat faces.

FIGS. 4 and 5 show the way the present invention compensates for the fact that the core rods at the mid portions of the faces of a polygonal indexing head are closer to its center of rotation than are the other core rods. FIG. 4 shows sensing means 44 supporting a plurality of sensing devices 46 in position to detect any residual molding material on a core rod 20' projecting from a flat face 50 of an indexing head 12' which rotates about an axis 14'.

Other sensing means 52 located above the core rods 20' includes a sensing device 54 which is a templet shaped to the contour of the core rod 20' so as to scan the entire length of the core rod and prevent any small pieces of molded material from going undetected as by passing between sensing devices such as the spaced fingers 46.

In FIG. 4 both of the sensing means 52 and 44 are moving toward the axis 14' as indicated by the arrows 58. This motion is produced, by means which will be explained later, during the time that the sensing means 52 and 44 are sensing a core rod 20' which is ahead of a mid point on the face 50.

As the indexing head 12' continues to rotate about the axis 14', with the core rods 20' moving toward the observer as viewed in FIGS. 4 and 5, the sensing devices 46 and 54 move closer to the center of rotation of the indexing head 12' to compensate for the fact that the surface of the face 50 which is passing the sensing devices 46 and 54 is progressively closer to the axis of rotation 14'.

FIG. 5 shows the mid portion of the face 50 passing the sensing devices 46 and 54. These devices move inwardly at a rate which causes them to always scan the same portion of the length of each successive core rod. By the time the mid portion of the face 50 has come into alignment with the sensing devices 46 and 54, as shown in FIG. 5, the sensing devices are at the limit of their movement toward the center of rotation 14' and they come to a stop and start a reverse movement away from the center 14'. This reverse movement which is the opposite of that indicated by the arrows 58 in FIG. 4, compensates for the fact that successive core rods will be progressively further from the center 14' as the far end of the face 50 moves toward a position in alignment with the sensing devices 46 and 54.

FIGS. 4 and 5 show sensing means 44 and 52 both above and below the core rods 20'. The preferred embodiment of the invention, however, has sensing means located only below the core rod. This simplifies the mechanism and has been found to be sufficient for detecting any consequential residual molding material on the core rods.

FIG. 6 shows a molding machine to which the invention is applied. This is a diagrammatic showing in which the indexing head 12' is attached to a shaft 62 that has a splined lower end 64 fitting into a splined hub 66. The hub 66 is rotated by indexing mechanism 68 located in a base housing 70 of the molding machine. The indexer 68 rotates the splined hub 66, and with it the indexing head 12' in a timed sequence to shift the core rods from one operational station to another as has been already described. This mechanism for controlling the intermittent rotation of the head 12' is well understood in the molding machine art and no further description of illustration of it is necessary for a complete understanding of this invention.

The injection mold 20 has a fixed lower section 20a and a movable upper section 20b. The upper section 20b is raised and lowered by clamp mechanism 72 operated by a hydraulic motor. A link 74 is connected at one end to a part of the mechanism that raises and lowers the upper section 20b. The other end of the link 74 is connected with a fixed fulcrum 76; and a mid portion 78 of the link 74 is connected by another link 80 to the center shaft 64 of the indexing head 12' so that the indexing head is raised and lowered one-half as much as the upper mold section 20 to permit the core rods to clear the mold cavities when the indexing head is moved angularly to carry the core rods from one operational station to the next.

All of the structure shown in FIG. 6 is conventional molding machine construction except for a cam 82 which is connected to the spline hub 66 for the purpose of transmitting motion to the sensing mechanism of this invention.

FIG. 7 shows the cam 82 which is secured to the hub 66 for rotation as a unit therewith. The cam 82 has three lobes corresponding to the three operational stations of the molding machine illustrated in the drawing. A cam follower 86 has a roller 88 which contacts with the cam 82. The roller 88 has bearings in which it rotates and these bearings are carried by a yoke 90 attached to one end of a bar 92 with teeth cut in its right hand face to form a rack 94; and this rack slides in a housing 96 with end portions 98 that support pinions 100. These pinions 100 mesh with the teeth of the rack and hold the bar 92 against a bearing surface 102 at the back of the housing 96. The housing 96 also extends up along the sides of the bar 92 to confine it against displacement transverse of the back bearing 102.

The teeth of the rack 94 do not extend all the way to the ends of the bar 92 and since the portions of the bar with the teeth are the only ones that can pass the pinions 100, the pinions prevent endwise displacement of the bar 92 beyond the length of the bar which has the rack teeth. This limits the stroke of the bar 92 but the length of the bar having the rack teeth is made long enough to provide for the maximum displacement of the cam follower 88 by the cam 82.

An air cylinder 104 is attached to the housing 96 by a bracket 106. This makes the housing 96 and the air cylinder 104 a single unit. A piston rod 108 extending from the cylinder 104 is attracted to the rod 92 by a bracket 110 so that operation of a piston in the cylinder 104 pushes the piston rod 108 toward the cam 82 and maintains the cam follower 88 in yielding contact with the cam 82. A spring can be used in place of the cylinder 104 and the construction illustrated is merely representative of resilient means for holding the cam follower 88 in contact with the cam 82.

A gear 114 meshes with the rack 94 and is rotated one way or the other by movement of the rack in opposite directions in response to the displacement of the cam follower 88 by the cam 82. This gear 114 is secured to a shaft 116 which extends through a part of a fixed frame 118 (FIG. 9) of the molding machine.

The opening in the fixed frame 118, through which the shaft 116 extends, provides a bearing for the shaft against radial thrust; and there is a collar 120 attached to the shaft 116 for resisting downward thrust load on the shaft 116. Another gear 122 is attached to the upper end of the shaft 116 above the fixed frame 118. This upper gear 122 meshes with a rack 124 which is a part of the sensing means 44. The rack 124 is similar to the rack 94 already described and it slides in bearings in a housing 126 which is similar to the housing 96 and it is held in bearings in the housing by pinions 128 which are similar to the pinions 100 previously described.

In the construction illustrated, the gear 122 is of larger diameter than the gear 114 (FIG. 9) so that axial movement of the rack 92 produces a greater axial movement of the rack 124 which meshes with the gear 122. This makes it possible to use a smaller cam for operating the sensing means. The housings in which the racks 94 and 124 slide are attached to the lower and upper sides of the fixed frame 118 by any suitable fastening means. Thus these housings are fixed portions of the molding machine.

FIG. 10 shows a bar 130 in which the teeth of the rack 124 are formed. This bar 130 is connected to a rod 132 which slides in a fixed bearing 134 attached to the fixed frame of the machine.

At the other end of the rod 132 there is the bar 44 which constitutes the part of the sensing means illustrated in FIG. 4. This bar 44 is preferably of square cross section and it extends through a housing 138 attached to the fixed frame of the machine.

The bar 44 rests on an underlying bearing surface of the housing 138 and the right hand side (as viewed in FIG. 10) of the bar 44 is resiliently held against bearing rollers 140 by a roller 142 on the left hand side of the bar 44.

This pressure roller 142 is carried on one end of another bar 144 supported by a fulcrum pin 146 extending upward from a surface of the fixed frame of the machine. A tension coil spring 148 is attached to the upper end of the pressure bar 144 and the other end of the spring 148 is attached to an anchor 150 which extends up from a fixed part of the machine frame.

Tension of the spring 148 pulls the rod 144 to urge the rod to turn counterclockwise about its fulcrum pin 146 and this counterclockwise force is resisted by the pressure roller 142 in contact with the left hand side of the bar 44.

As long as the sensing elements 46 on the lower end of the bar 44 do not contact with any residue on the core rods that pass across the bar 44, the rod 44 moves axially back and forth with the pressure roller 142 holding it in full bearing contact with the rollers 140.

If a core rod passing over the bar 44 has residual molding material on it, this residual molding material strikes against one or more of the sensing devices 46 and causes the square bar 44 to rock about its axis so that the upper corner of the bar 44 remains in contact with the rollers 140 but the lower corner moves away from the rollers 140 and pushes the pressure roller 142 toward the left in FIG. 10. This movement of the pressure roller 142 moves the rod 144 angularly about its fulcrum pin 146.

A limit switch 156 has an operating element 158 with a roller follower in contact with the bar 144. The clockwise movement of the bar 144 about its fulcrum 146 displaces the operating element 158 of the switch 156 and this causes the machine to stop so that the core rod can be cleaned.

As soon as the obstruction which has displaced the sensing elements 46 is removed, pressure of the roller 46 against the side of the square bar 44 returns the square bar 44 to its original position in full line contact with the rollers 140.

Displacement of the bar 44 about its longitudinal axis, is made possible by having the rod 132 screwed into the bar 130 and bar 44 at its opposite ends with one of the connections loose enough to permit relative rotation of the bar 44 and the rod 132; or the rod 132 can be made with low torsion resistance so that it can twist through the small displacement of the bar 44 by the sensing elements 46.

Although the construction illustrated provides a simple and reliable way of transmitting signals from the sensing elements 46 to a control switch 156 for stopping the operation of the machine, it will be evident that in a broad sense this mechanism is merely illustrative of sensing means that are capable of axial movement closer to and further from the center of rotation of the indexing head, and also capable of transmitting their displacement to the switch.

The preferred embodiment of the invention has been illustrated and described, but changes and modifications can be made and some features can be used in different combinations without departing from the invention as defined in the claims.

What is claimed is:

1. A molding machine including in combination a polygonal head angularly movable about an axis, core rods that extend from different side faces of the head, operational stations around the head and confronting the different faces of the head, said stations including one station at which plastic is applied to core rods projecting from one face of the head, and another station at which molded articles are stripped from the core rods, indexing mechanism for intermittently moving the head angularly about the axis to bring the core rods successively to different stations, a sensing device located along the path of movement of the core rods as they travel from the stripper station to the next successive station, the sensing device having sensing means located in position to be contacted by residue left on the core rods after they leave the stripper station, bearings in which the sensing device is movable to shift the sensing means closer to and further from the axis of rotation of the head, the sensing device also including mechanism that shift the sensing means in timed relation to the angular movement of the head to bring the sensing means closer to the axis of the head as a mid portion of a side face of the polygon approaches the sensing means and that moves the sensing means further from the axis of rotation of the head as a juncture of two sides of the polygon approaches the sensing means.

2. The molding machine described in claim 1 characterized by the mechanism that shifts the sensing means in timed relation to the angular movement of the head including a cam that moves in response to the angular movement of the head about its axis.

3. The molding machine described in claim 2 characterized by the cam being connected with the indexing head and rotating as a unit therewith.

4. The molding machine described in claim 2 characterized by a cam follower that is displaced by the cam in response to movement of the cam, and motion-transmitting means connecting the follower with the sensing means.

5. The molding machine described in claim 2 characterized by a cam follower that transmits angular movement to a gear, and a rack meshing with said gear, an axially movable support for the sensing means, and motion-transmitting connections through which the rack imparts axial movement to the support.

6. The molding machine described in claim 5 characterized by an elongated bearing housing in which the rack slides, and pinions gears carried by the housing and rotatable with respect thereto and in mesh with the rack on opposite sides of the location of said gear that meshes with the rack, the pinion gears holding the rack against the bearing surface in the housing on the other side of the rack from the pinion gears, the rack having a portion beyond its teeth that cannot pass the pinion gears.

7. The molding machine described in claim 3 characterized by an axially movable element including a rack, a cam follower on the axially movable element in position to contact with the cam, bearings carried by a fixed part of the machine and in which the axially movable element reciprocates as the cam follower moves over the surface of the cam, a gear in mesh with the rack and rotated by axial movement of the element of which the rack is a part, a shaft to which the gear is connected, a second gear connected with the shaft, a second rack in mesh with the second gear, said second rack being part of the sensing device which shifts the sensing means closer to and further from the axis of rotation of the head.

8. The molding machine described in claim 7 characterized by the gears having different numbers of teeth whereby a given axial movement of one rack transmits a different axial movement to the other rack.

9. The molding machine described in claim 1 characterized by a gear that moves angularly about its axis of rotation in response to the angular movement of the indexing head, a second gear that is turned by the first gear, a rack in mesh with the second gear, said rack being part of the sensing device that shifts the sensing means closer to and further from the axis of rotation of the head, the second gear being larger than the first gear so as to obtain a mechanical advantage that increases the displacement of the sensing means.

10. The molding machine described in claim 1 characterized by a fixed frame of the machine including a partition, a part of the sensing device that shifts the sensing means in its bearings being located on one side of the partition, a part of said mechanism being located on the other side of the partition, and motion-transmitting connections including a shaft that extends through the partition and gears on the ends of the shaft that are on opposite sides of the partition for transmitting motion through the partition to shift the sensing means in its bearings.

11. The molding machine described in claim 1 characterized by the machine being an injection blow molding machine including an injection mold at an injection station, a blowing station, and the stripper station being located ahead of the injection station, the sensing means being between the stripper station and the injection station and being carried on a generally rectangular support that slides axially in said bearings in which the sensing device is movable, a limit switch for stopping the operation of the indexing head, an operator for the limit switch including a bar with resilient means holding one end of the bar against the rectangular support, said rectangular support being movable into a canted position in said bearings by contact of residue on the core rods with the sensing means, the operator for the limit switch being moved by the canting of the rectangular support into position to operate the limit switch.

12. The molding machine described in claim 1 characterized by the polygonal head having three faces from which core rods extend, said faces being spaced from one another by equal angles of 60°, the mechanism that shifts the sensing means being correlated with the angular movement of the indexing head to move the sensing means closer to the axis of rotation of the head as the mid portion of the length of each of said three faces approaches the sensing means and to move the sensing means further from the axis as the end of each face beyond said mid portion approaches the sensing means.

13. The molding machine described in claim 1 characterized by said mechanism including a cam having as many lobes as there are faces of the head from which core rods extend, the cam rotating as a unit with the head, a cam follower supported by bearings which are at a fixed location on the machine whereby the cam follower moves in its bearings in response to the movement of the cam, said follower constituting a part of the mechanism that shifts the sensing means in timed relation to the angular movement of the head, said mechanism also including motion-transmitting means that are adjustable to change the position of the sensing means from any given displacement of the cam follower.

* * * * *